Nov. 7, 1967     G. E. REINKER     3,351,334
CONTAINER FOR MOLTEN FUSED SILICA
Filed March 1, 1965
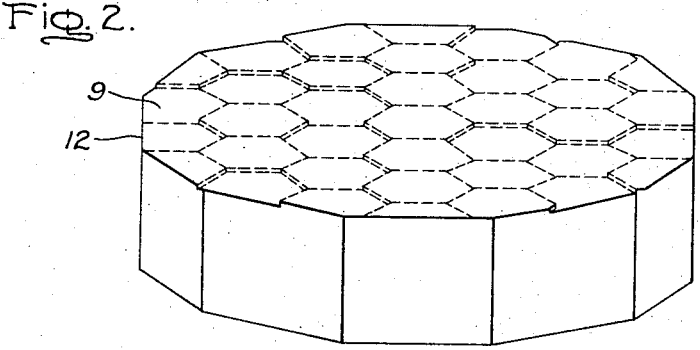
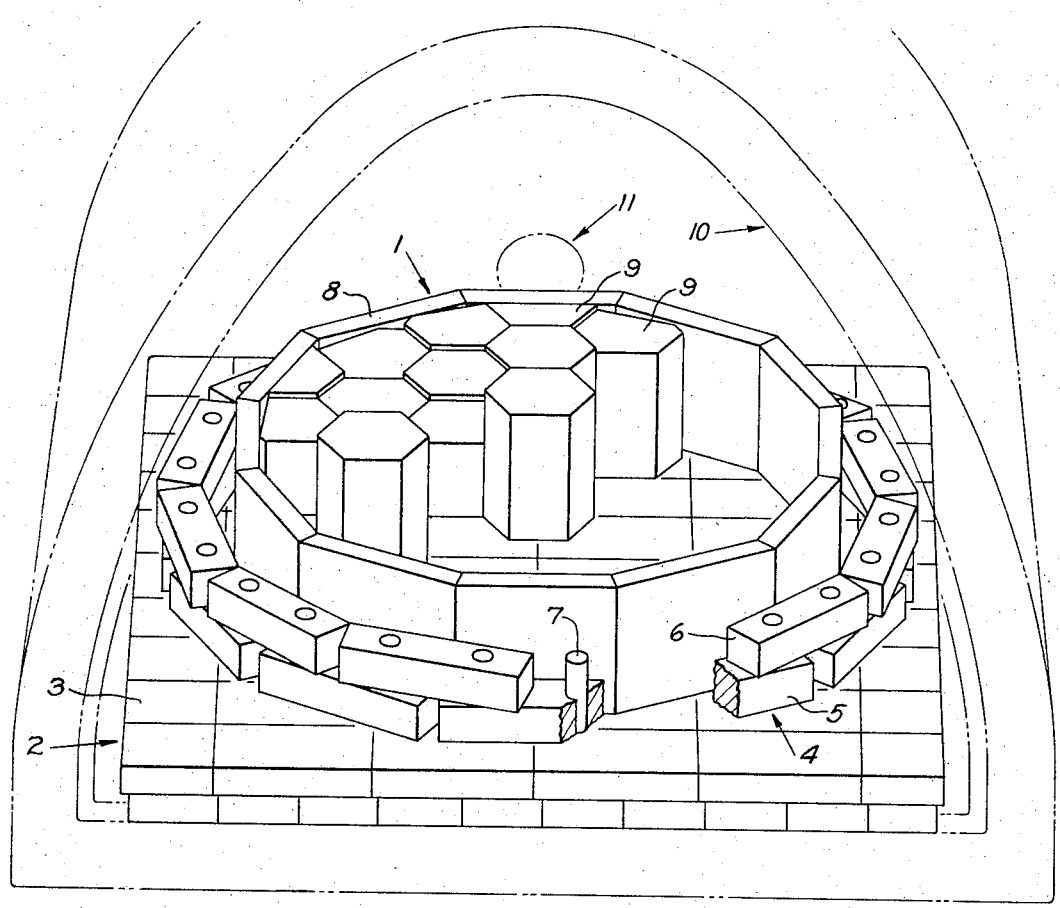
Inventor:
Gerald E. Reinker
by Otto Fichy
His Attorney

United States Patent Office 3,351,334
Patented Nov. 7, 1967

3,351,334
CONTAINER FOR MOLTEN FUSED SILICA
Gerald E. Reinker, South Euclid, Ohio, assignor to General Electric Company, a corporation of New York
Filed Mar. 1, 1965, Ser. No. 435,953
4 Claims. (Cl. 266—24)

ABSTRACT OF THE DISCLOSURE

A crucible for melting and reshaping fused silica bodies in an oxidizing atmosphere to form a solid body conforming to the shape of the crucible cavity. The cavity defining surface of a zirconium silicate wall of the crucible has a friable coating of pure zirconia powder of a thickness effective for preventing chipping of the solid reshaped fused silica body during removal of the crucible from the body.

---

The present invention relates to the fabrication of fused silica articles and its principal object is to provide a container or crucible wherein ingots of fused silica may be heated in an oxidizing atmosphere to conform to the shape of the crucible cavity. Further objects and advantages of the invention will be apparent from the following description, the accompanying drawing and the appended claims.

Copending application Serial No. 435,881 filed concurrently herewith and assigned to the assignee of the present application discloses and claims a method of fabricating a massive fused silica body in the form of a mirror blank for astronomical telescopes, for example, and the structure of the blank produced by the method. In fabricating such mirror blanks in accordance with the method of the copending application, elongated transparent ingots of substantially bubble free fused silica are shaped so as to fit together in upstanding side-by-side positions. The shaped ingots are assembled in this manner in a refractory container or crucible defining a cavity of the general shape of the fused silica body to be produced. The assembled ingots are then heated to a temperature substantially above the softening temperature of fused silica for a time sufficient to cause the ingots to soften and sag in the crucible and to cause their matching surfaces to flow together and form fusion joints uniting the ingots into a unitary solid body in which the integrity of the individal ingots is preserved when the body is cooled to room temperature.

In carrying out the method of the copending application, the fused silica ingots assembled in the crucible as described above are heated to a temperature of about 1800° C. in a fuel fired furnace in which the atmosphere is oxidizing. The crucible containing the ingots also is heated to this temperature. Thus, the crucible of necessity must consist of refractory material inert with respect to fused silica and to the furnace atmosphere at such elevated temperatures.

Graphite, zirconia ($ZrO_2$) and zirconium silicate ($Zr_2SiO_2$) are sufficiently refractory to be considered as useful materials for the crucible but each have been found unsuitable when used alone in making up the crucible for containing the molten fused silica in fabrication of the above articles of manufacture by the method of the copending application.

The use of graphite as the material of the crucible would require an electric resistant type furnace having connections for creating a vacuum or a neutral gaseous atmosphere within the furnace to protect the graphite from oxidizing. While this is the practice in making the ingots utilized in fabricating the massive fused silica body produced by the method of the copending application, it is not practical for fabricating the massive body itself from such ingots because the furnace in the large size required would be prohibitively expensive.

Zirconia and zirconium silicate may be used in natural gas-air fired furnaces in which the atmosphere is oxidizing but zirconia is not only expensive but can only be made in very small size bricks. Stabilized zirconia can be made in larger size bricks but it has been found that the stabilizing materials contaminate the surfaces of the fused silica in contact therewith and cause excessive devitrification of the fused silica. Further, stabilized zirconia is also expensive and is not available in the sizes and shapes desired for making up the crucible.

Zirconium silicate is satisfactory for making bricks of the size desired but when used in contact with molten fused silica, a reaction takes place with the result that while there is no devitrification of the fused silica the fused silica sticks to the zirconium silicate bricks which results in severe chipping of the fused silica body with consequent loss of considerable material from the body.

In accordance with the present invention, the above difficulties are avoided by making the load supporting walls of the crucible of zirconium silicate and coating the surfaces of said walls defining the cavity in the crucible with a layer of powdered pure zirconia.

In the drawing accompanying and forming part of this specification:

FIG. 1 is a perspective view as seen from above of a crucible embodying the invention with the shaped ingots partially assembled therein and with a suitable type of furnace shown in phantom; and FIG. 2 is a similar view of a massive fused silica mirror blank separated from the crucible of FIG. 1.

Referring to the drawing, the crucible 1 is made up of a hearth 2 including a top layer 3 of zirconium silicate slabs having expansion spaces therebetween and providing a flat horizontal supporting surface, a retaining wall 4 resting on the hearth 2 and consisting of a plurality of elongated blocks of zirconium silicate arranged in two courses 5 and 6 and pinned together by zirconium silicate pins 7. The inner wall 8 of the crucible is made up of upstanding zirconium silicate slabs fitted together at their matching edges and interposed between the retaining wall 5 and the assembly of ingots 9. The gas-air fired furnace accommodating the crucible is indicated at 10 and a port thereof at 11.

As stated above, when the ingots 9 are heated to a temperature above the softening temperature of fused silica and then reduced in temperature while in the crucible to form the massive solid unitary mirror blank 12 (FIG. 2) the fused silica would stick to the surface of the crucible if the zirconium silicate slabs were uncoated. This would result in severe chipping of the solid fused silica with consequent loss of considerable material from the blank when the crucible is dismantled to free the blank. This is not only expensive due to the waste of material but also in severe cases may make the entire blank useless for the purpose for which it is contemplated.

Such disadvantages are avoided in accordance with the invention when the inwardly facing surfaces of the slabs making up the part of the crucible defining the cavity accommodating the ingots are coated with a layer of zirconia. The zirconia coating is applied by brushing onto these slab surfaces a fifty percent polyvinyl alcohol suspension containing 72% by weight of monoclinic zirconia powder. A suspension consisting of 15% polyvinyl alcohol solution, 28% by weight, minus 325 mesh zirconia, 36% by weight, minus 100 mesh zirconia, 36% by weight, is satisfactory. Several coats of zirconia are applied to the slabs and each coating is allowed to air-dry slowly to minimize bubble entrapment in the coating. The coating is built up to form a layer having a thickness of at least approximately 1/16 to 1/8 inch which is effective for preventing the fused silica of the finished mirror blank or other massive fused silica body fabricated as described above from sticking to the surfaces of the slabs. Thicker coatings of zirconia may be used, when desired.

Zirconium silicate refractories are commercially available in standard brick sizes and also in special shapes. Such bricks are made from natural zircon sands which have a typical analysis as follows:

| | Percent |
|---|---|
| $ZrO_2$ | 65–66 |
| $SiO_2$ | 33–34 |
| $Al_2O_3$ | .5–1.0 |
| $Fe_2O_3$ | .25 |
| Other | .25 |

Zircon refractories are usually not used where the temperature to which they are subjected is higher than 1730° C. as the material thereof gradually dissociates at higher temperatures. However, in fabricating massive fused silica bodies as described above, the deterioration of the material is not so severe when heated in the furnace 10 to a temperature of about 1800° C. for five hours continuously as to prohibit its use. Massive fused silica bodies are successfully fabricated when the assembled ingots making up the body are subjected to this elevated temperature for a time even shorter than five hours.

On separation of the fused silica body 12 from the crucible 1 by dismantling the latter the zirconia coating sticks to the body and also to the zirconium silicate slabs but the zirconia grains in the coating are sandy at the end of the heat treatment so that the coating separates readily on separation of the slabs from the body thus preventing chipping of the fused silica body. The zirconia is removed from the body 12 by grinding or sand blasting.

While an embodiment of the invention has been shown in the form of a crucible for fabricating massive fused silica bodies, such as astronomical mirror blanks, it will be understood by those skilled in the art that the crucible may be of other shapes and structure than that shown and described and that the crucible may be modified for reshaping single ingots of fused silica into shapes and sizes different from those characteristics of such ingots produced commercially by the fusion of crystalline quartz or otherwise.

It will be understood further by those skilled in the art that the grain size of the zirconia powder used may be changed from that disclosed above and that powdered organic material, such as powdered cork, may be added to the coating material to make the coating more porous and friable. The organic material is, of course, removed from the coating by firing the coated slabs before the crucible is used.

What I claim as new and desire to secure by Letters Patent of the United States is:

1. A crucible for melting and reshaping fused silica ingots comprising walls consisting essentially of zirconium silicate reactive with molten fused silica and a non-reactive friable coating consisting essentially of pure zirconia on the surface of said walls defining the fused silica accommodating cavity in said crucible for preserving the integrity of the reshaped ingots during separation of the crucible therefrom.

2. A crucible as in claim 1 wherein the walls of the crucible are in the form of slabs and the coating is on the surface of the slabs facing the cavity.

3. A crucible as in claim 1 wherein the zirconia coating is at least approximately 1/16 inch in thickness.

4. A crucible as in claim 1 wherein the coating consists essentially of 50% by weight 100 mesh and 50% by weight 325 mesh mixed zirconia powder.

References Cited

UNITED STATES PATENTS

| | | | |
|---|---|---|---|
| 1,992,594 | 2/1935 | Winkler | 204—113 |
| 2,293,089 | 8/1942 | Wainer | 266—43 X |
| 2,766,032 | 10/1956 | Meister | 266—43 |
| 2,889,229 | 6/1959 | Steinhoff | 266—43 |
| 2,995,453 | 8/1961 | Noble et al. | 106—38.27 X |

WILLIAM J. STEPHENSON, *Primary Examiner.*

E. MAR, *Assistant Examiner.*